United States Patent [19]

Visser et al.

[11] 4,118,520

[45] Oct. 3, 1978

[54] PROTEIN FIBRES

[75] Inventors: Johannes Visser, Maassluis; Raoul Henricus Josephus Oosthoek, Rotterdam; Jan Willem Groeneweg, Dordrecht; Hendrik Dijkstra, Vlaardingen, all of Netherlands

[73] Assignee: Thomas J. Lipton, Inc., Englewood Cliffs, N.J.

[21] Appl. No.: 775,772

[22] Filed: Mar. 9, 1977

[30] Foreign Application Priority Data

Mar. 26, 1976 [GB] United Kingdom ............... 12223/76

[51] Int. Cl.² .......................... A23J 3/02; A23J 3/00
[52] U.S. Cl. ................. 426/574; 264/176 F; 426/657; 426/802
[58] Field of Search ............. 426/656, 657, 802, 104, 426/516, 517, 515, 580, 459, 574, 276, 93; 264/176 F, 83

[56] References Cited

U.S. PATENT DOCUMENTS

| | | | |
|---|---|---|---|
| 2,813,794 | 11/1957 | Ansol et al. ................... | 426/802 X |
| 2,952,543 | 9/1960 | Szezesniak et al. ............ | 426/656 X |
| 3,210,195 | 10/1965 | Kjelson et al. ................. | 426/802 X |
| 3,627,536 | 12/1971 | Arima et al. .................... | 426/574 |
| 3,662,671 | 5/1972 | Frederiksen et al. .......... | 426/580 X |
| 3,794,731 | 2/1974 | Dannert et al. ................ | 426/802 X |
| 3,800,053 | 3/1974 | Lange ............................. | 426/802 X |
| 3,836,678 | 9/1974 | Leidy et al. .................... | 426/574 X |
| 3,904,769 | 9/1975 | Sair et al. ...................... | 426/802 X |
| 3,953,612 | 4/1976 | Coplan et al. .................. | 426/802 X |
| 4,021,584 | 5/1977 | Rankowitz ...................... | 426/802 X |

FOREIGN PATENT DOCUMENTS 819,432 8/1975 Belgium.
4,101,473 8/1973 United Kingdom.

*Primary Examiner*—Kenneth M. Schor
*Attorney, Agent, or Firm*—Brumbaugh, Graves, Donohue & Raymond

[57] ABSTRACT

Fibres containing casein and at least one heat-settable protein are prepared by dry-spinning an aqueous protein mixture containing calcium- and phosphate ions at a temperature below the gelling point of the protein mixture and drying the fibres obtained.

13 Claims, No Drawings

PROTEIN FIBRES

The invention relates to a method for the preparation of mixed protein fibres by applying a dry-spinning process, to the mixed protein fibres obtained according to said process and to the production of meat analogues using such fibres in the formulation as the structure imparting component.

Belgian patent specification No. 819,432 describes dry-spinning of casein to obtain casein fibres which can be incorporated in reformed meat. The advantages of the dry-spinning method have been described in detail in this patent specification.

Since then attempts have been made to apply the same dry-spinning method to other proteins. The results were in disappointing in sofar that the fibres if obtained did not meet the requirements for incorporation in meat analogues, regarding texture- and structure-imparting properties.

We have found a process for producing mixed protein fibres which meet to a greater extent the above formulated requirements regarding strength and stability, than fibres in which casein is the only protein source.

The process according to the invention comprises:

(a) preparing an aqueous mixture of pH 5.0 to 6.6 of casein and at least one heat-settable protein, which contains per gram of casein at least 0.1 mM calcium ions and at least 0.04 mM orthophosphate ions.

(b) spinning such mixture at a temperature ranging from room temperature up to a temperature just below its gelling temperature through the orifices of a spinneret into a gaseous medium, and (c) drying the fibres obtained.

The heat-settable protein can be any protein, preferably in substantially undenatured state, which is capable of setting when heated, such as muscle proteins, ovalbumine, vegetable proteins e.g. proteins originating from oleaginous seeds, particularly soyprotein, in the form of a protein isolate or protein concentrate in the presence of carbohydrate material.

When the aqueous mixture of casein and heat-settable protein is prepared, it is preferable to use the protein in hydrated form, e.g. freshly precipitated protein, and to deaerate the mixture, so as to avoid the formation of weak points in the final product. The mixture is homogenized at a temperature which may vary from room temperature to the gelling point of the protein mixture. It should be stressed that the gelling temperature of the mixture does not necessarily coincide with the gelling point of the heat-settable protein.

So in the case where soyprotein is used in the mixture, the gelling temperature of the mixture is above 85° C., which is well above the normal gelling temperature of the 7S fraction of soyprotein in the absence of other material.

Suitable spinning dopes contain at least 30% protein and preferably from about 30–60% protein. The proportion of heat-settable protein can be varied, greatly depending on the required properties and product application of the fibres, economic considerations etc.

Proportions of heat settable protein varying from 10 to 70%, and proportions of casein from 90–30% calculated on the total amount of protein, are suitable. When the binary mixture casein-soyprotein is used, a proportion of 20–50% soyprotein appeared to be particularly suitable.

Calcium ions are included in the mixture preferably in the form of readily available calcium caseinate but also as calcium hydroxyde which can be added to acid casein or in the form of calciumchloride which can be allowed to react with sodiumcaseinate. Although the part played by calcium ions has not been entirely understood, it has appeared that an amount of 0.1 mM to 1 mM, preferably from 0.1 to 0.64 mM calcium ions per gram of casein, leads to fibres suitable for use in reformed meat formulations. In some instances, the above indicated proportions can be exceeded, particularly in the case where calcium-binding substances such as phytic acid or soyprotein are present in the mixture.

Orthophosphate ions are added to the protein mixture, preferably in the form of an aqueous solution of an alkali metal phosphate of a pH from 5.0 to 6.6. When calcium-caseinate is allowed to form in situ, the phosphate solution is preferably added after the addition of the calcium ions to the casein. The presence of the orthophosphate ions has a favourable influence on the final fibre properties, especially when used in a proportion of at least 0.04 mM orthophosphate per gram of casein.

A proportion of 0.04 mM–0.34 mM orthophosphate per gram of casein can be used advantageously in the form of $NaH_2PO_4$, $Na_2HPO_4$ or mixtures thereof, depending on the desired final pH of the mixture.

The temperature at which the dry-spinning operation is carried out should be below the gelling point of the protein mixture.

In the case where soyprotein is used as the heat-settable protein, a spinning temperature ranging from room temperature up to about 85° C. and preferably between 40 and 70° C. can suitably be applied.

The dry-spinning operation is effected by pumping the spinning dope and pressing it through spinneret orifices of 0.05–2.00 mm diameter. The continuous filaments of mixed protein emerging from the spinneret are dried and wound or transported by a reel.

In the case where thin fibres are required, the continuous filaments emerging from the spinneret are conducted through a conditioning zone, preferably air, with a wet-bulb temperature which is equal to or lower than the spinning temperature, preferably at least 5° C. below the spinning temperature. The drying temperature applied for a relatively quick drying operations is from 100° C. to 120° C. We have found that drying to a moisture content of less than 11% and preferably from 0–9% led to filaments or fibres of reasonably good stability.

Before using these fibres in the preparation of meat analogues the fibres are rehydrated in water, of a temperature above the heat-setting temperature of the protein, and preferably above 90° C. The stability to boiling water and to sodiumchloride containing environments was increased by including in the rehydrating medium 3–10% calciumchloride or by using ordinary tap water, which in some areas contains a sufficient amount of calcium ions.

The following examples illustrate the invention.

EXAMPLE I

A spinning mixture was prepared starting from the following ingredients:

160 g. of a soyprotein isolate (50% protein) obtained by extracting defatted soybeanmeal with water and lowering the pH to the isoelectric point to precipitate the protein.

320 g. calciumcaseinate which contains 0.5 mM calcium ions per gram of casein.

520 g. of an aqueous solution containing 8.8 g. $NaH_2PO_4.H_2O$

The pH of the mixture was 5.9.

The mixture was intensively mixed, transferred to a sigma kneader, heated to 60° C. and deaerated under reduced pressure.

The spinning mixture obtained was brought into the reservoir of a dry-spinning device which had been brought to 60° C. Via a gear pump the mass was pressed through a spinneret with orifices of 0.5 mm diameter into a space with conditioned air. Here the wet bulb temperature was about 55° C. The emerging continuous filaments passed a drying zone of about 100° C. where they were dried to a moisture content of about 20% and were taken up by a transporting reel, and allowed to dry further to a moisture content of 11%.

Stretch ratios of about 40 were reached and fibres of 100 μm diameter were obtained. The fibres were rehydrated before use in 4% calciumchloride containing boiling water.

EXAMPLE II

A spinning mixture was prepared starting from the following ingredients:

240 g. spray-dried soyisolate.
160 g. calciumcaseinate containing 0.5 mM calcium ions per gram of casein.
600 g. of an aqueous solution containing 4.6 g. $NaH_2PO_4$ 1 aq. and 4.0 g. $Na_2PHO_4.2$ aq.

The protein ingredients were mixed separately with the phosphate solution before mixing them together. The procedure of example I was followed, with the exception that the mixing and spinning operations were carried out at 70° C.

EXAMPLE III

The procedure of example I was repeated with the exception that a protein mixture consisting of 80% calciumcaseinate and 20% ovalbumine was used.

Mixing and spinning were performed at 55° C.

EXAMPLE IV

Preparation of a chicken analogue.

A bundle of rehydrated casein/soya (4:1) fibres was cut into small pieces and mixed in a binder using a Hobart mixer.

40 parts of rehydrated fibres were mixed with 40 parts of an egg white containing binder consisting of 15% dried egg-albumin, 2% flavour, 10% fat and 73% water; and
20 parts of an aqueous meat mix containing 10% raw chicken meat, salt and spices.

The mix obtained was formed in the shape of a chicken breast and was heat-set during 15 minutes at 85° C. After heat-setting the product was battered and stored in deep-frozen condition.

We claim:
1. A process for producing casein-containing mixed protein fibers, which comprises:
    (1) preparing an aqueous mixture having a pH from 5.0 to 6.6, which contains:
        (a) at least 30% protein based on total mixture weight, which protein consists of casein in a proportion varying from 90 to 30% and at least one heat-settable protein in a proportion varying from 10 to 70%, based on the total weight of the protein;
        (b) at least 0.1 mM calcium ions per gram of casein; and
        (c) at least 0.04 mM orthophosphate ions per gram of casein,
    (2) spinning such mixture, at a temperature ranging from room temperature up to a temperature just below the mixture's gelling point, through the orifices of a spinneret into a gaseous medium, to obtain fibers, and,
    (3) drying the fibers to a moisture content of less than 11%.
2. A process according to claim 1, wherein the heat-settable protein is a protein originating from oleaginous seeds.
3. A process according to claim 2, wherein soy protein is used.
4. A process according to claim 1, wherein the heat-settable protein is ovalbumin.
5. A process according to claim 1, wherein casein and the heat-settable protein are mixed together in hydrated form at a temperature ranging from room temperature up to a temperature just below the gelling temperature of the mixture.
6. A process according to claim 1, wherein polyunsaturated fatty acid triglycerides are included in the mixture.
7. A process according to claim 1, wherein a mixture of casein and soy protein is homogenized and spun at a temperature up to 85° C.
8. A process according to claim 1, wherein the protein mixture is spun through spinneret orifices of 0.05-2.00 mm diameter.
9. A process according to claim 1, wherein the fibers emerging from the spinneret orifices are conducted through a gaseous conditioning zone having a wet-bulb temperature which is equal to or below the spinning temperature.
10. A process according to claim 9, wherein the wet-bulb temperature in the conditioning zone is at least 5° C. below the spinning temperature.
11. A process according to claim 9, wherein the fibers emerging from the spinneret orifices are conducted through air.
12. A process according to claim 1, wherein the fibers are dried at a temperature varying from 100°-120° C.
13. Fibers prepared by the process described in claim 1.

* * * * *